United States Patent
Lai et al.

(10) Patent No.: US 6,955,693 B2
(45) Date of Patent: Oct. 18, 2005

(54) DYE COMPOSITION AND THE USE THEREOF

(75) Inventors: Bao-Kun Lai, Taoyuan (TW); Cheng-Hsiang Hsu, Taipei (TW); Ya-Chi Tseng, Taipei (TW)

(73) Assignee: Everlight USA, Inc., Pineville, NC (US)

(*) Notice: Subject to any disclaimer, the term of this patent is extended or adjusted under 35 U.S.C. 154(b) by 48 days.

(21) Appl. No.: 10/601,599

(22) Filed: Jun. 24, 2003

(65) Prior Publication Data

US 2004/0261200 A1 Dec. 30, 2004

(51) Int. Cl.[7] .................. D06P 1/384; C09B 67/24
(52) U.S. Cl. ...................... 8/641; 8/643; 8/549
(58) Field of Search .................. 8/549, 641, 643

(56) References Cited

U.S. PATENT DOCUMENTS

| | | | |
|---|---|---|---|
| 4,448,583 A | * 5/1984 | Corso | 8/527 |
| 4,703,112 A | 10/1987 | Mischke et al. | 534/624 |
| 5,484,899 A | 1/1996 | Deitz et al. | 534/618 |
| 5,565,007 A | * 10/1996 | Schrell et al. | 8/538 |

FOREIGN PATENT DOCUMENTS

| | | | |
|---|---|---|---|
| EP | 0 683 251 A1 | * 4/1995 | |
| EP | 0 668 328 A2 | * 8/1995 | |
| GB | 1353899 | 5/1974 | D06P/3/66 |

OTHER PUBLICATIONS

Derwent abstract of EP 0 668 328 A2 Aug. 1995.*

* cited by examiner

Primary Examiner—Margaret Einsmann
(74) Attorney, Agent, or Firm—Bacon & Thomas, PLLC

(57) ABSTRACT

A dye composition is disclosed, which comprises a blue anthraquinone dye of the following formula (I)

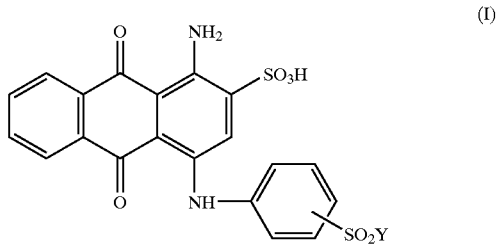

wherein Y is $-CH=CH_2$, $-CH_2CH_2Cl$ or $-CH_2CH_2OSO_3H$; and a gray-black azo dye of the following formula (II)

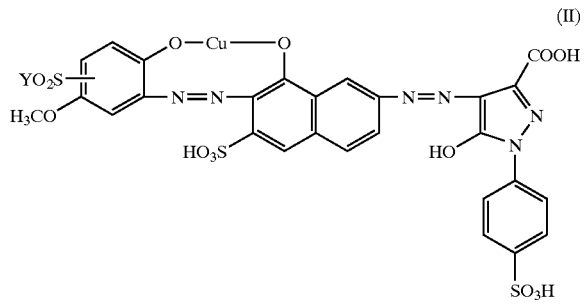

wherein Y is defined as the above. The dye compositions of the present invention have good stability and build-up property. The dye compositions are suitable for dyeing and printing materials that contain either cellulose fibers, such as cotton, artificial cotton, linen, and artificial linen, or synthetic polyamide, such as wool, silk, and nylon. The materials obtained through treatment with the dye compositions aforementioned show excellent properties, especially in wash-off, level-dyeing, build-up, light fastness and perspiration-light fastness.

8 Claims, No Drawings

DYE COMPOSITION AND THE USE THEREOF

BACKGROUND OF THE INVENTION

1. Field of the Invention

The present invention relates to dye compositions and the use thereof, more particularly to navy blue reactive dye compositions and the use thereof for dyeing cellulose materials.

2. Description of Related Art

Reactive dyestuffs generally refer to dyestuff molecules containing reactive functional groups that react with fiber. The reactive functional groups can react to the hydroxyl group of cellulose fiber or the amide, imino and carboxylic acid group in animal and polyamide synthetic fibers. Thus, with the covalent bonding between the dyestuffs and fibers, the purpose of dying is achieved. For example, U.S. Pat. No. 4,703,112, U.S. Pat. No. 5,484,899, and GB. Pat. No. 1,353,899 disclosed fiber reactive dyestuffs, which are applied by exhaustion, printing or continuous dyeing.

The reactive dyestuffs for dyeing or printing cellulose fibers or cellulose containing fibers need the properties of leveling, reproducibility, solubility, fastness etc to a particularly high quality.

However, the reactive dyestuffs available presently are short of a navy blue dye having superior light fastness such that the dyed material shows a poor light fastness. Take the blue dyestuffs for example, it is known that anthraquinone dyestuff is excellent in various fastness properties, nevertheless, anthraquinone dyestuff is hard to achieve in matching middle or dark colors for it has a brighter color than others.

The present invention provides dye compositions that have both excellent light fastness and superior perspiration-light fastness through the combination of anthraquinone dyestuff with other dyestuffs. In addition to the various fastness properties that already exist, the dye compositions of the present invention are economic in dyeing middle to dark colors.

SUMMARY OF THE INVENTION

The present invention provides a dye composition, which has both excellent light fastness and perspiration-light fastness. The dye compositions are economic in dyeing middle to dark colors and can achieve various fastness properties. When combined with red and yellow dyestuffs that also have good light fastness, the composition containing the three primary colors not only overcomes the problems of color fading and discoloration, but also exhibits outstanding light fastness and perspiration-light fastness.

The dye composition of the present invention includes:

(a) a blue anthraquinone dye of the following formula (I):

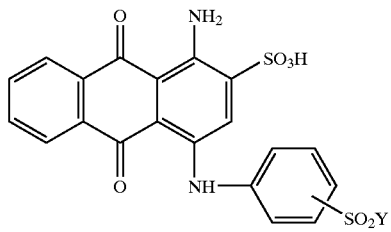

wherein Y is $-CH=CH_2$, $-CH_2CH_2Cl$, or $-CH_2CH_2OSO_3H$; and (b) a gray-black azo dye of the following formula (II):

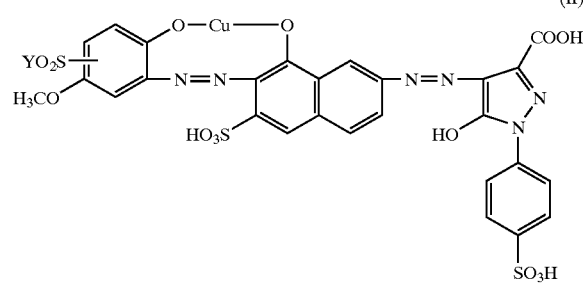

wherein Y is defined as the above.

The present invention also provides a method for dyeing or printing fiber materials containing hydroxyl or amino groups, in particular for cellulose fiber materials, which use a solution containing a dye composition aforementioned to dyeing fiber materials, wherein said cellulose fiber material is cotton.

The dye compositions of the present invention are suitable for dyeing and printing materials that contain either cellulose fibers, such as cotton, artificial cotton, linen, and artificial linen, or synthetic polyamide, such as wool, silk, and nylon. The materials obtained through utilizing the dye compositions above-mentioned show excellent properties, especially in light fastness and perspiration-light fastness.

Other objects, advantages, and novel features of the invention will become more apparent from the following detailed description.

DETAILED DESCRIPTION OF THE PREFERRED EMBODIMENT

The dye compositions of the present invention combining with red and yellow dyestuffs form a three-primary-color composition, which overcomes the color fading and discoloration problems, and exhibits outstanding properties of light fastness and perspiration-light fastness.

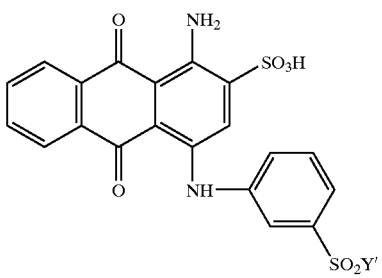

(Ib)

wherein Y' is —CH=CH₂ or —CH₂CH₂OSO₃H. Most preferably it is the blue anthraquinone dye of the following formula (I-1)

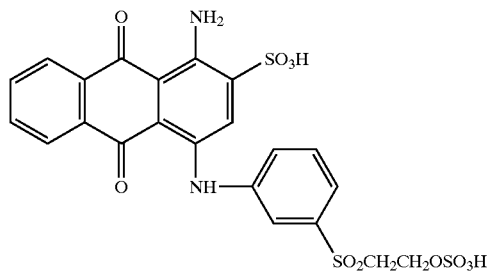

(I-1)

The synthesis of formula (II) may refer to UK Patent No. 1,162,144. Preferably the compound of formula (II) is the gray-black azo dye of the following formula (IIa)

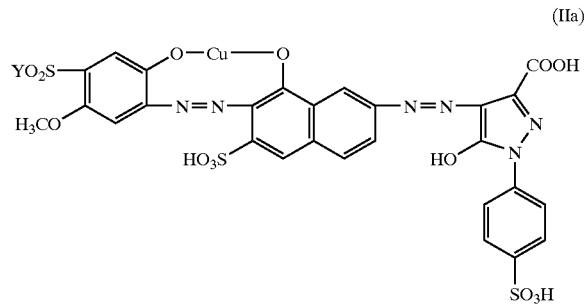

(IIa)

wherein Y is —CH=CH₂, —CH₂CH₂Cl, or —CH₂CH₂OSO₃H. More preferably it is the gray-black azo dye of the following formula (IIb)

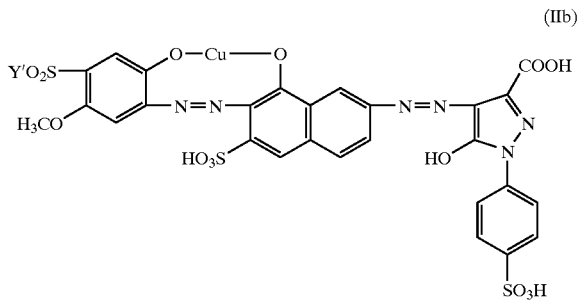

(IIb)

wherein Y' is —CH=CH₂ or —CH₂CH₂OSO₃H. Most preferably it is the gray-black azo dye of the following formula (II-1)

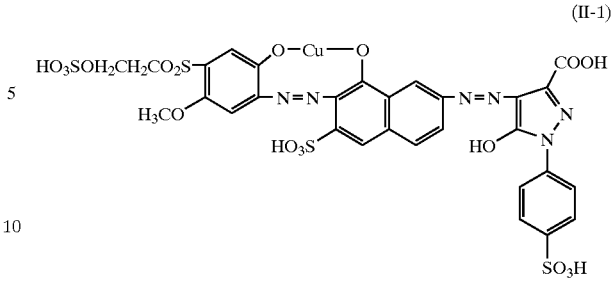

(II-1)

The compositions of the present invention can be prepared in several ways. For example, the dye components can be prepared separately and then mixed together to make powder, granular and liquid forms, or a number of individual dyes may be mixed according to the dyeing recipes in a dyehouse. The dye mixtures of the present invention can be prepared, for example, by mixing the individual dyes. The mixing process is carried out, for example, in a suitable mill, such as a ball mill or a pin mill, or kneaders or mixers.

If necessary, the dye composition of the present invention may contain inorganic salts (e.g. sodium chloride, potassium chloride and sodium sulfate), dispersants (e.g. β-naphthalenesulfonic acid-formaldehyde condensation products, methylnaphthalenesulfonic acid-formaldehyde condensation products, acetylaminonaphthol based compounds, etc.), non-dusting agents (e.g. di-2-ethylhexyl terephthalate, etc.), pH buffering agents (e.g. sodium acetate, sodium phosphate, etc.), water softeners (e.g. polyphosphate, etc.), well-known dyeing assistants, etc.

The form of the dye composition of the present invention is not critical. The dye composition can be powders, granules or liquids form.

For the convenience of description, the compounds are depicted as free acids in the specification. When the dyestuffs of the present invention are manufactured, purified or used, they exist in the form of water soluble salts, especially alkaline metallic salts, such as sodium salts, lithium salts, potassium salts or ammonium salts.

The dye compositions of the present invention can be used to dye a wide range of fiber materials, especially for cellulose fiber materials. These dye compositions can also be used to dye natural cellulose fibers and regenerated cellulose fibers, such as cotton, linen, jute, ramie, mucilage rayon, as well as cellulose based fibers.

The dyeing by using the dye compositions of the present invention can be any generally used process. Take exhaustion dyeing for example, it utilizes either inorganic neutral salts such as sodium sulfate anhydride and sodium chloride, or acid chelating agents such as sodium carbonate and sodium hydroxide, or both of them. The amount of inorganic neutral salts or base is not of concern, and can be added once or separately. In addition to that, it is optional to add traditionally used dyeing assistants, such as leveling agents and retarding agents. The temperature of dyeing ranges from 40° C. to 90° C., and preferably 50° C. to 70° C.

A cold batch-up dyeing method firstly carried out pad-dyeing by using inorganic neutral salts such as sodium sulfate anhydride and sodium chloride, and acid chelating agents such as sodium silicate and sodium hydroxide, and then the materials were rolled up to start dyeing.

Continuous dyeing is single batch-up dyeing, which mixes a well-known acid chelating agent such as sodium carbonate or sodium bicarbonate with a pad-dyeing liquor, and pad-dyeing is carried out. After that, the dyed materials are dried or evaporated to fix the color, and then the dyed materials are treated with well-known inorganic neutral salts such as sodium sulfate anhydride and sodium chloride, and acid chelating agents such as sodium hydroxide or sodium silicate. Preferably, the treated materials are dried or evaporated again by common methods to finally fix the color.

Among textile printing methods, a one-way printing method utilizes a printing paste containing an acid chelating agent such as sodium bicarbonate to print the materials, thereafter the printed materials are dried or evaporated to fix the color. However, a two-phase printing method includes printing by printing paste and fixing color by soaking the printed materials in high temperature (90° C. or above) solution containing inorganic neutral salts (like sodium chloride) and acid chelating agents (like sodium hydroxide or sodium silicate). The dyeing methods of the present invention are not restricted to the aforementioned methods.

The dye compositions of the present invention not only have excellent fixative ability and build up, but are also provided with good properties in darkness of colors, levelness, cleaning, solubility, and exhausting and fixative extent. Therefore, exhaustion dyeing at a low temperature and pad dyeing can be carried out in a short period of time. The dyed products are highly fixative and minimally damaged after soap cleaning.

The dye composition of the present invention exhibits superior hue and excellent cellulose-dyestuff combination stability in dyeing cellulose fiber materials, no matter the dyeing environment is acid or base. Besides, the dyed cellulose fiber materials have good properties of light fastness, perspiration-light fastness, and wet fastness, e.g. clean fastness, water fastness, sea water fastness, cross-dyeing fastness, and perspiration fastness, as well as fastness of wrinkling, ironing, and friction. Therefore, it is a valuable reactive navy blue dye for cellulose fibers in the dyeing industry. The dye compositions have the materials dyed with excellent properties and resulted in outstanding light fastness and perspiration-light fastness. Owing to the change of the demand of the market, the general reactive dyestuff will not meet the requirements of the extremely light color and mélange market any more. The dye compositions of the present invention exhibit better perspiration-light fastness in light color, and particularly in mélange of extremely light color, which leads to fit in with the requirements and expectations of market.

Many examples have been used to illustrate the present invention. The examples sited below should not be taken as a limit to the scope of the invention. In these examples, the compounds are represented in the form of dissolved acid. However, in practice, they will exist as alkali salts for mixing and salts for dyeing.

In the following examples, quantities are given as parts by weight (%) if there is no indication. The relationship between weight parts and volume parts are the same as that between kilogram and liter.

EXAMPLE 1

The blue anthraquinone dye of formula (I) (55 weight parts) and the gray-black azo dye of formula (II) (45 weight parts) were prepared, which were then mixed completely to form a dye composition.

EXAMPLE 2–3

The preparation methods of Examples 2 and 3 were the same as Example 1, except the ratios of raw material were different, which are listed in table 1 below.

TABLE 1

| Example | Dye of formula (I-1) | Dye of formula (II-1) |
|---|---|---|
| Example 2 | 30 parts | 70 parts |
| Example 3 | 70 parts | 30 parts |

COMPARATIVE EXAMPLE 1–4

Compare the dyeing properties of the dye compositions of the present invention with the prior dyestuffs, which have large sales volume and wide purpose in the marketplace, like reactive black B, reactive blue BRF, or reactive navy blue FBN.

The preparation methods of Comparative examples 1 to 4 were the same as Example 1, except the kinds of raw materials and the ratios of each raw material were different, which are listed in table 2 below.

TABLE 2

| Example | Dye of formula (I-1) | Dye of formula (II-1) | Reactive Black B | Reactive Blue BRF | Reactive Navy Blue FBN |
|---|---|---|---|---|---|
| Comparative example 1 | 60 parts | — | 40 parts | — | — |
| Comparative example 2 | — | — | 40 parts | 60 parts | — |
| Comparative example 3 | — | 100 parts | — | — | — |
| Comparative example 4 | — | — | — | — | 100 parts |

The dye of comparative Example 3 is fully composed of the dye of formula (II-1) in order to show the dyeing properties without the existence of the dye of formula (I-1). Besides, use of reactive navy blue FBN acts as the dye of Comparative example 4 to demonstrate the perspiration-light fastness of the present invention in ultra-light color mixing.

TESTING EXAMPLE 1

Light Fastness Testing by Exhaustion Dyeing

The light fastness of each dye composition of Example 1 and Comparative example 1–4 was tested. Also their mixtures composed of the three primary colors, i.e. yellow, red, and blue, were tested. The detailed description is as the following.

First, three dye liquors were prepared, wherein each respectively had a concentration of 0.1%, 0.5%, and 1.0% on the weight of the fabric (o.w.f). After that, inorganic neutral salt was added, and then dyeing of the un-mercerized cloths made of pure cotton was started. The un-mercerized cotton cloths were soaked in the dye liquors. At the same time, dyeing of the dyestuffs was started at 60° C. and then the dyestuffs started diffusing to adhere the cloths with the aid of a horizontal shaker, which is followed by adding an alkali agent that made the dyestuffs react with fiber completely to achieve firm adherence. The resulting dyed cloths were water cleaned, soap washed, and tumble-dried to form finished products.

The obtained products aforementioned were tested in a light fastness machine, in which the samples and blue color labels were put and illuminated by a Xenon-Arc Lamp Light (ISO 105-B02), wherein the blue color labels were classified into eight degrees, i.e. L1 to L8. When the color fading of DE=1.7±0.3 occurred on the sample, the illuminating of the

TABLE 3

| Example | Concentration of dye liquors (o.w.f) | Degree of color labels |
| --- | --- | --- |
| Example 1 | 0.1% | 4 |
|  | 0.5% | 4–5 |
|  | 1.0% | 5–6 |
| Comparative example 1 | 0.1% | 3 |
|  | 0.5% | 3–4 |
|  | 1.0% | 4 |
| Comparative example 2 | 0.1% | 2–3 |
|  | 0.5% | 2–3 |
|  | 1.0% | 3 |
| Comparative example 3 | 0.1% | 3–4 |
|  | 0.5% | 4 |
|  | 1.0% | 5 |
| Comparative example 4 | 0.1% | 3 |
|  | 0.5% | 3–4 |
|  | 1.0% | 4 |

Currently, the red dyestuff-Everzol Red LF-2BL™ (Everlight Chemical Inc., Taiwan, ROC) and the yellow dyestuff-Everzol Yellow 3RS™ (Everlight Chemical Inc., Taiwan, ROC) have large sales volumes and wide purposes in the marketplace, and are the main products for color mixing. In the present invention, Everzol Red LF-2BL™ (Everlight Chemical Inc., Taiwan, ROC) and Everzol Yellow 3RS™(Everlight Chemical Inc., Taiwan, ROC) were chosen to be mixed with the navy blue dye compositions of the present invention to show the performance of color mixing of the three primary colors, i.e., yellow, red, and blue of the present invention. The resulted are listed in table 4.

TABLE 4

| The composition of dye mixture composed of three primary colors (yellow, red, and blue) | Concentration of dye liquors (o.w.f) | Degree of color labels |
| --- | --- | --- |
| ①Example 1 | 0.1% | 4–5 |
| ②Everzol Red LF-2BL ™ | 0.5% | 5–6 |
| ③Everzol Yellow 3RS ™ | 1.0% | 6 |

After the illuminating testing, the cloths were measured by a DATA MATCH computer metering system to find the difference of dyeing degree and color fading. The higher degree of dyeing and the lesser extent of color fading are preferred. Under high energy illumination, the light fastness of the dye composition of example 1, i.e. the dye composition of the present invention, is above degree 5, which proves that the dye compositions of the present invention have a high degree of dyeing, a low extent of color fading, and good light fastness. Also, among the color mixing compositions containing the yellow, red, and blue dyes, the light fastness of the composition containing the dye of example 1 attains degree 5, which shows that the dye composition of the present invention has higher degree of dyeing, a lesser extent of color fading, and better light fastness than the existing art.

TESTING EXAMPLE 2

Perspiration-Light Fastness Testing by Exhaustion Dyeing

The dyeing steps were the same as testing example 1, except that the dyed cloths were soaked in artificial perspiration solution (ISO-105-E04), in which the acid solution and alkali solution are prepared as listed in table 5 below.

TABLE 5

| Artificial perspiration solution (ISO-105-E04) | | | |
| --- | --- | --- | --- |
| Acid solution | | Alkali solution | |
| $C_6H_9O_2N_3.HCl.H_2O$ | 0.5 g/l | $C_6H_9O_2N_3.HCl.H_2O$ | 0.5 g/l |
| NaCl | 5.0 g/l | NaCl | 5.0 g/l |
| $NaH_2PO_4.2H_2O$ | 2.2 g/l | $Na_2HPO_4.2H_2O$ | 2.5 g/l |
| Adjusting pH to 5.5 | | Adjusting pH to 8.0 | |

After the dyed cloths were fully moistened in the artificial perspiration solution, the pick up of the dyed cloths was controlled to be 100%, and then the Xenon-Arc Lamp Light (ISO 105-B02) illuminating test was proceeded with. The eight-degree blue labels and cloth samples were put into the light fastness machine together to be illuminated, wherein the cloth samples were illuminated from L1 to L8. The illuminations were stopped when a color fading of DE=1.7±0.3 occurred on the cloth samples. The results are summarized in tables 6 and 7 below.

TABLE 6

|  | Acid perspiration light Concentration of dye liquors (o.w.f) | | | Alkali perspiration light Concentration of dye liquors (o.w.f) | | |
| --- | --- | --- | --- | --- | --- | --- |
|  | 0.1% | 0.5% | 1.0% | 0.1% | 0.5% | 1.0% |
| Example 1 | 3–4 | 4 | 5 | 2–3 | 3 | 3–4 |
| Comparative example 1 | 2–3 | 3 | 3–4 | 1–2 | 2 | 2–3 |
| Comparative example 2 | 2 | 2 | 2–3 | 1–2 | 1–2 | 2 |
| Comparative example 3 | 3 | 3–4 | 4–5 | 2 | 2 | 2–3 |
| Comparative example 4 | 3 | 3 | 3–4 | 2 | 2 | 2–3 |

TABLE 7

| Color mixing composition composed of the three primary colors-yellow, red, and blue | Acid Perspiration Light Concentration of dye liquors (o.w.f) | | | Alkali Perspiration Light Concentration of dye liquors (o.w.f) | | |
| --- | --- | --- | --- | --- | --- | --- |
|  | 0.1% | 0.5% | 1.0% | 0.1% | 0.5% | 1.0% |
| ①Example 1 ②Everzol Red LF-2BL ™ ③Everzol Yellow 3RS ™ | 4–5 | 5 | 5 | 4 | 4 | 4–5 |

The samples dyed by the above-mentioned Example 1, Comparative examples 1 to 4, and mixture compositions of the three primary colors, i.e. yellow, red, and blue, were illuminated by light and then the difference of dyeing ability and the extent of color fading were compared by using the DATA MATCH computer metering system. The higher degree of dyeing and the lesser extent of color fading are preferred. By illuminating at a high energy level, the perspiration-light fastness of the dye composition of example 1, i.e. the dye composition of the present invention, is above degree 3, which means that the dye composition of the present invention has a higher degree of dyeing, a lesser extent of color fading, and a better perspiration-light fastness compared to prior arts. Also, among the color mixing compositions composed of dyes of the three primary colors, i.e. yellow, red, and blue, the perspiration-light fastness of the composition containing the dye of example 1 achieved degree 4, which revealed that the dye composition of the present invention has higher degree of dyeing, a lesser extent of color fading, and a better perspiration-light fastness than the prior art.

TESTING EXAMPLE 3

Perspiration-Light Fastness Testing by Using the Cold Printed Batch-Up (C.P.B.) Dyeing Method The dye composition of example 1 was further proceeded with cold printed batch-up dyeing. Similarly, the C.P.B dyeing test was carried out by using the single color dye and the mixing color dyes composed of the three primary colors, i.e. yellow, red, and blue. The preparing method and the results will be described in the following description.

First, four dye liquors were prepared, wherein each of dye liquor respectively had a concentration of 5, 10, 20, and 40 g/l, and a volume of 80 ml, which was followed by adding 20 ml of an alkali solution and high-speed mixing. The amounts of the alkali solutions are listed in the following table 8.

TABLE 8

|  | Concentration of dye liquor, g/l | | | |
| --- | --- | --- | --- | --- |
| Amount of alkali solution | 1–20 | 20–40 | 40–70 | 70 |
| NaOH(38° B'e), ml/l | 15 | 20 | 25 | 30 |
| Na2SiO3(48° B'e), g/l | | 100 | | |

The mercerized cotton twill was dyed with the above-mentioned dye liquors, wherein the twill was soaked in the dye liquors to achieve the adhesion and diffusion of the dyestuffs. The pick up of the mercerized cotton twill was controlled to be 70% and the temperature of dye liquors was controlled to be 25° C. After that, pad-dye in a printed dyeing testing machine was carried out, and then the pad-dyed cloths were rolled up at room temperature for 4 hours. Afterwards, the dyed cloths were water cleaned, soap washed, and tumble-dried to become finished products.

The dyed materials were soaked individually in an artificial perspiration solution prepared as listed in table 5. After the dyed materials were completely damped, the Xenon-Arc Lamp Light (ISO 105-B02) illumination test was proceeded with at a controlled pick up of 100%. The eight-degree blue labels and dyed samples were illuminated in a light fastness machine, wherein the blue labels were classified into degrees ranging from L1 to L8. When the color fading of DE=1.7±0.3 occurred on the samples, illuminating of the samples was stopped. The results are summarized in tables 9 and 10 below.

TABLE 9

|  | Acid perspiration light Concentration of dye liquors (g/l) | | | Alkali perspiration light Concentration of dye liquors (g/l) | | |
| --- | --- | --- | --- | --- | --- | --- |
|  | 5 | 10 | 20 | 5 | 10 | 20 |
| Example 1 | 4–5 | 5 | 5–6 | 3–4 | 4 | 5 |

TABLE 10

| Color mixing composition composed of the three primary colors-yellow, red, and blue | Acid Perspiration Light Concentration of dye liquors (g/l) | | | Alkali Perspiration Light Concentration of dye liquors (g/l) | | |
| --- | --- | --- | --- | --- | --- | --- |
|  | 10 | 20 | 40 | 10 | 20 | 40 |
| ①Example 1 ②Everzol Red LF-2BL ™ ③Everzol Yellow 3RS ™ | 4–5 | 5 | 5 | 4 | 5 | 5 |

The cloth samples dyed by the above-mentioned example 1 and mixture compositions of the three primary colors, i.e. yellow, red, and blue, were soaked in artificial perspiration solutions, and tested by illuminating using the DATA MATCH computer metering system in order to compare the difference of dyeing ability and the extent of color fading. The higher degree of dyeing and the lesser extent of color fading are preferred. By illuminating at a high energy level, the perspiration-light fastness of the dye composition of example 1, i.e. the dye composition of the present invention, is above degree 4, which means that the dye composition of the present invention has a higher degree of dyeing, a lesser extent of color fading, and better perspiration-light fastness than the prior art. Also, among the color mixing compositions composed of dyes of the three primary colors, i.e. yellow, red, and blue, the perspiration-light fastness of the composition containing the dye of example 1 was above degree 5, which exhibited that the dye composition of the present invention has a higher degree of dyeing, a lesser extent of color fading, and a better perspiration-light fastness than the prior art.

Generally speaking, the color matching of the dyestuffs is through mixing of the three primary colors, i.e. yellow, red, and blue. In particular, for the color matching of the middle to dark colors, the navy blue component faded and changed quite obviously after exposure to light in the prior art due to the lower light fastness of the navy blue component comparing with that of yellow and red ones. The dye compositions of the present invention have improved the light fastness of the navy blue dyestuff. In particularly, the ultra-light color collocated by the dye compositions of the present invention, the red dyestuff-Everzol Red LF-2BL™ (Everlight Chemical Inc., Taiwan, ROC), and the yellow dyestuff-Everzol Yellow 3RS™ (Everlight Chemical Inc., Taiwan, ROC) is qualified to have less variation in color after exposure to light. Besides, the color fading of the sample having the ultra-light color above-mentioned is the same as its variation in color. As the dye compositions of the present invention are used with the red dyestuff-Everzol Red LF-2BL™ (Everlight Chemical Inc., Taiwan, ROC) and the yellow dyestuff-Everzol Yellow 3RS™ (Everlight Chemical Inc., Taiwan, ROC), the dye mixture not only achieves a fastness above 4, but also exhibits the outstanding properties of the present invention as well as the higher efficiency thereof.

The testing results of Examples 2 and 3 of the present invention in the tests referring to testing Examples 1 to 3 above-mentioned are also compatible with those of Example 1.

The dye compositions of the present invention are suitable for common uses and have excellent properties. They can be applied to cellulose fibers by general dyeing methods, such as exhaustion dyeing, printed-dyeing, or continuous dyeing that are commonly used in the dyeing of reactive dyestuffs The dye compositions of the present invention are water-soluble dyestuffs that have a highly commercial value. The dye compositions of the present invention can manufacture dyed materials that exhibit excellent properties in all aspects, especially in cleaning, darkness of colors, levelness, light fastness, and perspiration-light fastness.

Although the present invention has been explained in relation to its preferred embodiment, it is to be understood that many other possible modifications and variations can be made without departing from the scope of the invention as hereinafter claimed.

What is claimed is:

1. A dye composition comprising:
   (a) a blue anthraquinone dye of the following formula (I), which comprises 15 to 85% by weight

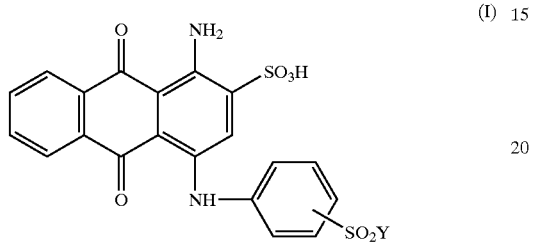

wherein Y is —CH=CH$_2$, —CH$_2$CH$_2$Cl, or —CH$_2$CH$_2$OSO$_3$H; and (b) a gray-black azo dye of the following formula (II), which comprises 85 to 15% by weight

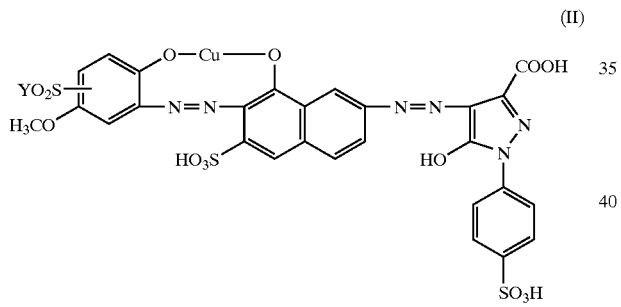

wherein Y is defined as the above.

2. The dye composition of claim 1 comprising formula (I) 30 to 70% by weight, and formula (II) 70 to 30% by weight.

3. The dye composition of claim 1, wherein said formula (I) is the following formula (Ia)

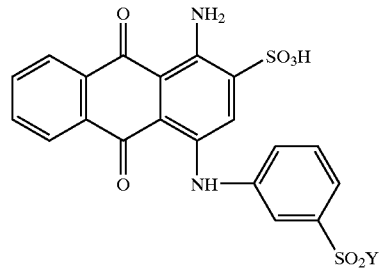

wherein Y is —CH=CH$_2$, —CH$_2$CH$_2$Cl, or —CH$_2$CH$_2$OSO$_3$H.

4. The dye composition of claim 1, wherein said formula (II) is the following formula (IIa)

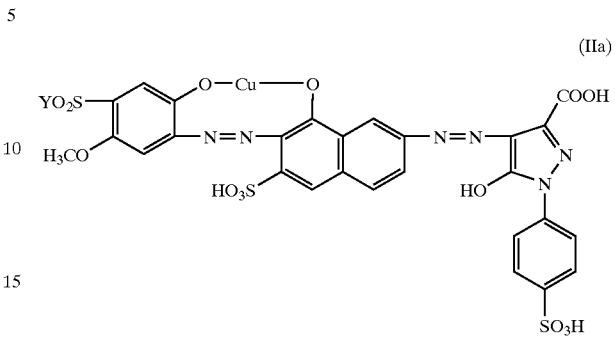

wherein Y is —CH=CH$_2$, —CH$_2$CH$_2$Cl, or CH$_2$CH$_2$OSO$_3$H.

5. The dye composition as claimed in claim 1, wherein said formula (I) is the following formula (Ib)

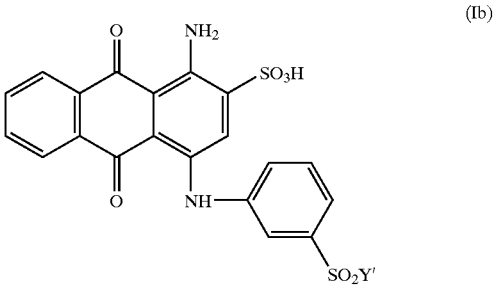

wherein Y' is —CH=CH$_2$ or —CH$_2$CH$_2$OSO$_3$H.

6. The dye composition of claim 1, wherein said formula (II) is the following formula (IIb)

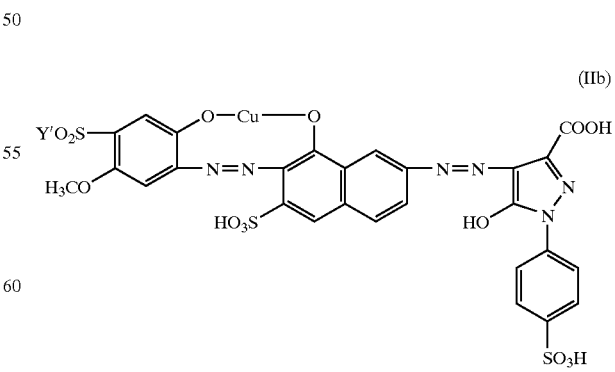

wherein Y' is —CH=CH$_2$ or —CH$_2$CH$_2$OSO$_3$H.

7. The dye composition of claim 5, wherein said formula (Ib) is the compound of the following formula (I-1)
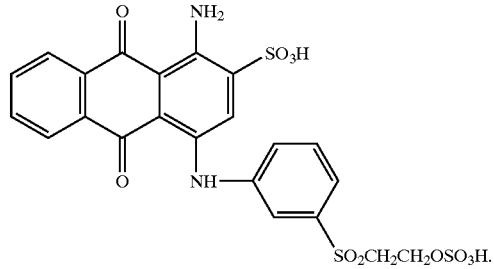
8. The dye composition of claim 6, wherein said formula (IIb) is the compound of the following formula (II-1)
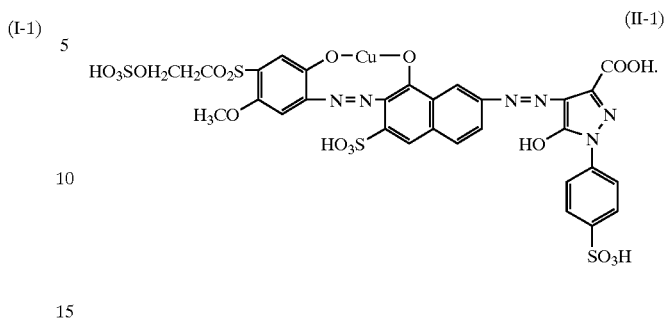
* * * * *